United States Patent [19]

Whittam

[11] 4,080,313

[45] Mar. 21, 1978

[54] CATALYST

[75] Inventor: Thomas Vincent Whittam, Stockton-on-Tees, England

[73] Assignee: Imperial Chemical Industries Limited, London, England

[21] Appl. No.: 746,629

[22] Filed: Dec. 1, 1976

[30] Foreign Application Priority Data

Dec. 10, 1975 United Kingdom ............... 50641/75

[51] Int. Cl.$^2$ ........................ B01J 29/06; B01J 29/00; B01J 23/16
[52] U.S. Cl. ................................ 252/455 R; 252/457; 252/465
[58] Field of Search .................... 252/455 R, 457, 465

[56] References Cited

U.S. PATENT DOCUMENTS

| 3,258,431 | 6/1966 | Fisher et al. | 252/457 |
| 3,864,461 | 2/1975 | Miller et al. | 252/465 X |
| 3,923,646 | 12/1975 | Hilfman | 252/465 X |

Primary Examiner—Carl F. Dees
Attorney, Agent, or Firm—Cushman, Darby & Cushman

[57] ABSTRACT

A catalyst composition for hydrogenative purification of hydrocarbons contains a divalent oxide such as CoO, a polyvalent oxide such as $MoO_3$, pseudobohmite and/or pseudogamma alumina and preferably also a clay mineral and is made using a defined procedure in which active components are added before and after shaping by wet granulation or extrusion.

17 Claims, No Drawings

CATALYST

This invention relates to a catalyst and in particular to a catalyst containing compounds of metals of Groups V-VIII of the Periodic Table, methods of making it and processes using such a catalyst.

Accoding to the invention a catalyst composition comprises pseudobohmite alumina and/or pseudo-gamma alumina, 0-80% of a clay mineral, an oxide of at least one divalent metal optionally in partial or complete chemical combination with that alumina and an oxide of at least one polyvalent metal from Groups VA, VIA and VIIA of the Periodic Table and is in the form of extrudates or approximately spherical granules of diameter at least 0.5 mm.

In this specification the Periodic Table referred to is that set out in the index to "Abridgments of Specifications" published by the UK Patent Office; and all percentages are by weight unless otherwise stated and, for the composition, are calculated on the constituents non-volatile in air at 650° C.

The expression "catalyst composition" used herein for the oxide mixture includes both compositions having themselves a catalytic effect for a chemical reaction and also compositions that are precursors of catalysts, for example in which oxides have to be converted to some extent to free metal or to sulphide or both before they exert any or a required degree of catalytic activity. Usually the oxide mixture is handled in commerce and is sulphided or reduced or both by the operator of the catalytic process. The term "polyvalent" does not imply any particular level of valency in the composition.

Pseudobohmite is a hydrated alumina intermediate in water content and crystallite size between amorphous alumina hydrates and alpha alumina monohydrate (bohmite). Its water content is commonly 20 to 35%. Its crystallite diameter is typically in the range 20-50 Angstrom units, which is to be compared with at least 150 and possibly over 1000 for alpha alumina monohydrate. The specific surface of pseudobohmite is typically in the range 200-400 m$^2$/g, which is at least about 2-4 times that of alpha alumina monohydrate; on calcination water is lost and an anhydrous alumina of high specific surface remains, provided the calcination temperature is not high enough to produce alpha alumina. A typical specific surface is in the range 200-600 (for example 350) m$^2$/g for pseudobohmite calcined for 6 hours at a temperature in the range 300°-800° C. The calcination product is pseudo-gamma alumina at temperatures up to about 850° C, then delta alumina at up to about 1000° C and theta alumina up to about 1200° C. (Pseudo-gamma alumina is a transition alumina related to gamma alumina similarly as pseudobohmite is related to alpha alumina monohydrate).

The X-ray diffreaction pattern of the pseudobohmite is characteristic and distinct from that of crystalline bohmite of crystallite size 150 Angstrom units and over, in having a 0.5-1° shift to lower Bragg angles, and broadened diffraction peaks, owing to the lower degree of crystallinity, as well as a shift of the first X-ray interference from about 6.11 to a value in the range 6.3 to 6.8 Angstrom units.

It is to be understood that pseudobohmite has been defined elsewhere more narrowly, and therefore the pseudobohmit forming part of the catalyst accoding to the invention may include alumina modifications outside such definitions. However, at least 30% of the alumina in the composition has a crystallite diameter in the range 25-50 Angstrom units as in pseudobohmite narrowly defined.

A preferred form of pseudobohmite for the support has X-ray diffraction maxima (Cu K alpha radiation) of 6.3 - 6.8, 3.1 - 3.2 and 2.3 - 2.35 Angstrom units. Preferably it has a tapped bulk density of 0.2 - 0.7 g/ml. Preferably it is characterised by having, after calcination at 250° C, a pore volume distribution as follows:

| pore diameter Angstrom units | pore volume ml/g |
| --- | --- |
| under 60 | 0 - 0.2 |
| 60 - 120 | 0.02 - 0.5 |
| 120 - 800 | 0.05 - 0.5 |
| 800 - 2000 | 0.03 - 0.2 |
| over 2000 | 0.1 - 3.0 |
| total | 0.2 - 4.4 |

Useful surveys and definitions of varieties of alumina are to be found in a paper by Osment (No. 730276 of the International Automotive Engineering Congress, Detroit, 8-12 January 1973) and in the brochure "Alumina Properties", second edition 1972, published by Alcoa Reseach Laboratories.

The divalent metal of the catalyst composition preferably is or includes a transition metal, especially one or more of those that in the metallic or sulphide stage have catalytic activity, for example iron, cobalt, nickel, copper or zinc. The proportion of divalent metal calculated as monoxide is suitably in the range 1-25%, especially 2-8% on the total of such oxide, the polyvalent metal oxide, alumina and clay mineral, excluding clay mineral in excess of 25% (see below). The extent of chemical combination of the divalent transition metal oxide with alumina is suitably in the range 5 to 50% of that oxide in the catalyst composition. If a non-transition metal oxide is present alternatively or in addition to the divalent transition metal oxide, it is preferably from Group IIA of the Periodic Table and especially magnesia, and 1-25% of it is suitably present, for example about 10%. (This is additional to any magnesia present in combined form in the clay mineral).

In a preferred catalyst composition the divalent metal oxide has been brought into intimate association with the pseudobohmite by reacting a corresponding soluble salt with it before adding a compound of the polyvalent metal, possibly by co-precipitation with aluminium under pseudobohmite-forming conditions.

The proportion of polyvalent metal oxide is suitably in the range 5-25%, especially 8-17%, calculated as the equivalent real or notinal oxide MO$_3$ on the total of such oxide, the divalent metal oxide, alumina and excluding clay mineral in excess of 25% (see below). Most importantly the polyvalent oxide present is that of molybdenum or tungsten or both, especially when the divalent oxide is that of cobalt or nickel or both.

In addition to the metal oxides and the pseudobohmite the catalyst composition may contain further alumina, suitably to the extent of 0.5 to 10% of the sum of the pseudobohmite and pseudogamma aluminas. This further alumina is preferably of a type formed under acid conditions, such as by the thermal decomposition of an aluminium salt such aluminium nitrate or a basic aluminium nitrate, which salt may have been introduced as such or by in situ reaction of an acid with alumina, for example the pseudobohmite.

The clay mineral affords several advantages. One advantage is that the catalyst composition extrudates or granules are mechanically stronger. If a clay mineral is present, the pseudoböhmite can be introduced as the relatively large particles defind below, which are more convenient to handle than more finely divided material. Another advantage is that the clay can introduce an acidfunction if this is required, as it may be for hydrogenative treatment of high molecular weight carbonaceous material such as residual oil. Among the clays that can be used are kaolinites, montmorillonites, attapulgites (including sepiolites), illites and allophanes and other clays such as fuller's earth, chlorite and serpentine. Modified clays, for example acid-washed clays or clays neutralised by for example calcium or magnesium oxide, can be present. If the catalyst composition is to be used for a process in which a hydrocarbon is treated and the formation of free carbon is to be minimised, the clay is preferably a sepiolite.

Instead of or in addition to the clay mineral the composition may contain synthetic silicates, for example magnesium silicates or acidic aluminium silicates such as amorphous or crystalline zeolites. For specialised purposes it may contain halogen ions or hydraulic cement.

In order to achieve advantageous mechanical strength the proportion of clay mineral is suitably in the range 10–25%. Depending on which clay mineral is used and on the process for which the catalyst is to be used, the proportion may be higher, for example in the range 25–80%, especially 45–65% when for example the clay mineral is a magnesium silicate such as sepiolite. The excess over 25% is regarded as a diluent, but the so-diluted catalyst still has adequate activity for hydrosulphurising hydrocarbons boiling at up to 200° C and also is especially suitable when an inexpensive catalyst is needed as a result of short process life.

The catalyst composition extrudates or granules have preferably their largest dimension up to 25, especially 2–12 mm. The extrudates are conveniently approximately cylindrical but may be non-circular in cross section, for example elliptical or lobed. The granules may have been formed by any convenient method, for example prilling or wet-granulation. Typically the mean diametrical crushing strength is over 2 kg, for example 20–75 kg for cylindrical extrudates and 3–10 kg for granules, when their diameter is in the range 2–5 mm, with corresponding strength at other diameters. The bulk density is typically in the range 0.4 to 1.0 g/ml for extrudates and 0.3 to 0.8 g/ml for granules.

The composition preferably has a high pore volume, especially over 0.2 and for example in the range 0.5 to 1.5 ml/g, at least 0.03 ml/g of which is in pores of diameter greater than 2000 Angstrom units. The surface area is preferably in the range 100–400 m²/g. These micromeritic data apply to the composition in calcined form ready for charging to a catalytic reactor.

In preferred compositions the particle diameter distribution of the pseudoböhmite is chosen so as to afford the above-mentioned high pore volume in large pores, in combination with adequate particle strength. In one distribution, to be used preferably in the presence of a clay mineral, the percentages by weight are

| diameter microns | % |
| --- | --- |
| over 600 | 0.0 |
| 300 – 600 | 0 – 15 |
| 105 – 300 | 5 – 45 |
| 75 – 105 | 0 – 20 |
| 40 – 75 | 15 – 30 |
| 20 – 40 | 10 – 30 |
| 10 – 20 | 0 – 30 |
| under 10 | 0 – 30 |

In another distribution, for which the presence of the clay mineral is less advantageous, the maximum diameter is smaller, as follows:

| diameter, microns | % |
| --- | --- |
| over 105 | 0.0 |
| 40 – 105 | 0 – 15 |
| 20 – 40 | 15 – 25 |
| 10 – 20 | 20 – 40 |
| under 10 | 30 – 50 |

The invention includes catalyst compositions derived from these so far described by reduction of at least part of the oxide content to free metal or conversion to sulphide or both, and also compositions in which the pseudoböhmite has been converted partly or wholly to pseudo-gamma alumina or delta alumina or, less preferably, theta alumina by heat treatment.

The invention provides methods of making the catalyst composition by bringing together at least two of (a) the pseudoböhmite, (b) the divalent metal oxide or oxides and (c) the polyvalent oxide or oxides and/or compounds thermally decomposable to such oxides, with one or more of the other materials set out above as optional or preferred ingredients, shaping the resulting mixture by extrusion or by granulation into approximately spherical granules, adding any components not already added, and drying and calcining the resulting product.

In the preferred order of mixing the ingredients the divalent oxide or compound thermally decomposable thereto is contacted with the pseudoböhmite before any compound of the polyvalent metal or metals. Thus contacting can be effected by for example co-precipitating a compound thermally decomposable to oxide of the divalent metal or metals with an aluminium compound under pseudoböhmite-forming conditions. Alternatively a soluble compound of the divalent metal or metals can be mixed with already-formed pseudoböhmite before or during or, less preferably, after the shaping operation; in these methods the compound is preferably a salt or a strong acid, for example, a nitrate and excess acid or a soluble aluminium salt, may be present. The extrudates or approximate spheres formed in the shaping operation may be dried, advantageously at a relative humidity in the range 50–90%, since this leads to greater strength. Alternatively they may be steamed. Preferably they are calcined at, for example, 500°–900° C to effect at least some spinel formation. If co-precipitation is used, the precipitate is dried and calcined preferably within 48 hours of being formed.

After addition of the divalent oxide and and such drying and/or steaming and/or calcination the oxide of the polyvalent metal or metals are applied preferably as soluble salts thermally decomposable to oxide. The salt may contain the metal as cation or anion; for example, molybdenum and tungsten are conveniently introduced as ammonium molybdate or ammonium tungstate. A further calcination at for example 400°-850° C is then preferably carried out.

If a clay mineral is to be present it is preferably mixed with the pseudoböhmite before or during the shaping operation. The same applies to any other water-insoluble ingredients. If a strong acid or water soluble aluminium salt is present during shaping, it suitably corresponds to 0.1 to 10% calculated as $HNO_3$ of the alumina introduced as pseudoböhmite.

The preferred shaping method is wet-granulation, especially in a dishgranulator, although a paddle mixer or blunger can be used. The granules are normally sieved to select the required pore diameter range, whereafter oversize granules are crushed and recycled and undersize granules are recycled without or with crushing.

The catalysts are useful in a variety of chemical processes, especially in the hydrogenative removal of hetero-atoms from hydrocarbon derivatives containing them, such as in the purification by hydrodesulphurisation, hydrodehalogenation, hydrodenitrification, hydrodeoxygenation and/or hydrodemetallisation of hydrocarbon feedstocks for catalytic or combustion processes. In such processes the heteroatom is converted to (respectively) hydrogen sulphide or halide, ammonia or water, which can easily be separated physically or chemically, or to metals and metal compounds, which are deposited. This type of purification is important for removing sulphur from normally liquid hydrocarbon feedstocks ("naphtha") to be catalytically reacted with steam to give gases containing hydrogen, carbon monoxide, carbon dioxide and methane, in various proportions according to the temperature, pressure and steam ratio. As a result of the high activity and particular pore size distribution of preferred catalysts according to the invention, it appears that it will be practicable to hydrodesulphurise thoroughly the heavy naphthas and kerosenes boiling in the range 200°-350° C, in addition to the naphthas boiling at up to 200° C which are hydrodesulphurised using available catalysts. If the catalyst is deactivated by carbon formation it can be regenerated by treatment with steam and air.

Other important uses of the catalysts include the shift reaction of carbon monoxide with steam to give carbon dioxide and hydrogen using feed gases containing sulphur, so that the catalyst is in the sulphided state. The catalyst can also be used for decomposing nitrogen oxides in carbon monoxide containing gases preparatory to a shift reaction.

EXAMPLE 1

Preparation of support powder

A solution of sodium aluminate containing $Na_2O$, $Al_2O_3$ and water in the molar proportions 1.25, 1.0, 54.5 respectively and a solution of aluminium sulphate and cobalt nitrate containing $AL_2O_3$, $SO_3$, Co, $NO_3$ and water in the molar proportions 1.0, 3.0, 0.13, 0.26, 127 respectively were fed at 60° C and the rate of 30 liters of each solution per hour to a continuous mixer until 12.5 liters of each had been used. The effluent was collected in an ageing tank and aged without stirring until 5 minutes after the end of the mixing: thus the first-formed precipitate was aged for 30 minutes and the last-formed for 5 minutes. The slurry was filtered over the next 25 minutes and then washed until substantially free of sodium on a continuous vacuum filter with water at a rate of 120 liters per hour. The filter cake was reslurried, refiltered and then washed with 10% ammonium nitrate solution at 50 liters per hour. The filter cake was then dried overnight at 90° C. By X-ray diffraction it was shown to be mainly pseudoböhmite with crystallite size about 32 and major peaks at 6.44, 3.15 and 3.32 Angstrom units. A test sample of it was heated at 750° C for 6 hours and examined micromeritically, with the following results:

| | |
|---|---|
| Surface area | 285 m$^2$/g |
| Powder bulk density | 0.5 g/cc |
| Pore volume distribution: | |
| Pore diameter | Pore volume |
| Angstrom units | ml/g |
| under 60 | 0.11 |
| 60–120 | 0.12 |
| 120–800 | 0.15 |
| 800–2000 | 0.12 |
| 2000–20000 | 0.11 |
| total | 0.61 |
| | |
| Particle diameter distribution: | |
| diameter, microns | % |
| 150–600 | 40.5 |
| 105–150 | 10 |
| 75–105 | 12 |
| 40–75 | 15.2 |
| 20–40 | 13 |
| 10–20 | 5 |
| 5–10 | 1 |

Shaping of support

A quantity of the dried but uncalcined support powder was fed to an 18 inch granulating dish rotating at 40 rpm with an angle of tilt of 45°. Water was fed slowly to form granules of up to about 5mm. The rates of feed were such as to produce granules spilling over at the rate of about 6 kg per hour. These contained about 60% of material volatile at up to 1000° C. They were dried at 120° C for 6 hours and calcined at 750° C for 6 hours.

Preparation of catalyst

A quantity of the calcined granules was placed in a rotating drum and sprayed with sufficient ammonium molybdate liquor (17.3% $MoO_3$) to apply 11.5% of $MoO_3$ to the granules. The product was dried at 120° C for 6 hours and calcined at 550° C for 6 hours. Its surface area was 285 m$^2$/g and its pore volume distribution as follows:

| Pore diameter, Angstrom units | Pore volume ml/g |
|---|---|
| under 60 | 0.13 |
| 60 – 120 | 0.01 |
| 120 – 800 | 0.025 |
| 800 – 2000 | 0.015 |
| 2000 – 20000 | 0.06 |

A fraction having the size range 2.4 to 4.75 mm (ASTM 4-8), bulk density 0.72 g/ml and crush strength 3.6 kg was selected for a hydrodesulphurisation process run to be described below.

The support and catalyst were observed to be deep blue, showing that several percent of the cobalt oxide had combined with alumina to form spinel.

EXAMPLE 2

Preparation of catalyst from spray-dried psedoböhmite

The pseudoböhmite used had the following properties:

| | |
|---|---|
| Loss at 1000° C | 35% |

-continued

| | |
|---|---|
| Structure by X-ray diffraction: disordered pseudoböhmite with crystallite size about 45 and major peaks at 6.45, 3.14 and 2.32 Angstrom units. | |
| Surface area after calcination at 250° C: | 280 m²g |
| Powder density after calcination at 250° C: | 0.28 g/ml |

Pore volume distribution:

| Pore diameter Angstrom units | Pore volume ml/g |
|---|---|
| Under 60 | 0.1 |
| 60 – 120 | 0.15 |
| 120 – 800 | 0.28 |
| 800 – 2000 | 0.04 |
| 2000 – 20000 | 0.60 |
| total | 1.17 |

Particle diameter distribution:

| diameter, microns | % |
|---|---|
| 150 – 600 | 24 |
| 105 – 50 | 10 |
| 75 – 105 | 7 |
| 40 – 75 | 15 |
| 20 – 40 | 25 |
| 10 – 20 | 10 |
| 5 – 10 | 10 |
| Under 5 | 5 |

One hundred parts by weight of this pseudoböhmite alumina were blended dry with 15.3 parts by weight of sepiolite in a mixer for 5 minutes; on a loss-free basis the proportion of alumina to sepiolite was 5:1. The blend was fed continuously into a 1 m diameter dish granulator at the rate of 35–45 kg/hour, using an angle of tilt of 38° to the vertical and a speed of 18 rpm. At the same time a solution of cobalt nitrate (8.7%) and aluminium nitrate (4.6%) was sprayed in at a rate affording 3.4% of CoO on the total of alumina plus sepiolite and 3.75% of equivalent nitric acid on the total alumina. The granules as discharged from the dish contained 59.5% of material volatile up to 1000° C. They were dried in a rotary drier using gas initially at 250° C, calcined at 550° C for 6 hours, and transferred to a rotating drum in which they were sprayed with sufficient ammonium molybdate liquor (17.3% MoO₃) to apply 12.5% of MoO₃. The loaded granules were dried at 80° C at a high relative humidity and calcined at 550° C for 6 hours. The surface area of the granules was 244 m²/g. Their pore volume distribution was as follows:

| Pore diameter Angstrom units | Pore volume ml/g |
|---|---|
| under 60 | 0.1 |
| 60 – 120 | 0.13 |
| 120 – 800 | 0.34 |
| 800 – 2000 | 0.09 |
| 2000 – 20000 | 0.03 |

A fraction having the size 3 ± 0.8 mm, mean crushing strength 2.3 kg and a bulk density of 0.49 was selected for a hydrodesulphurisation process run to be described below. The colour of the catalyst was a deep blue.

EXAMPLE 3

Preparation of catalyst from pulverised pseudoböhmite

The pseudoböhmite had the following properties:

| | |
|---|---|
| Loss at 1000° C | 40% |
| Structure by X-ray diffraction pseudoböhmite with crystallite size about 45 and major diffraction intensities at 6.40, 3.18 and 2.33 Angstrom Units. | |
| Surface area after calcination at 250° C : | 268 m²/g. |
| Powder density after calcination at 250° C : | 0.25 g/ml |

Pore volume distribution:

| Pore diameter Angstrom units | pore volume ml/g |
|---|---|
| under 60 | 0.01 |
| 60 – 120 | 0.30 |
| 120 – 800 | 0.25 |
| 800 – 2000 | 0.08 |
| 2000 – 20000 | 0.43 |
| total | 1.07 |

Particle diameter distribution:

| diameter, microns | % by weight |
|---|---|
| 40 – 105 | 1.5 |
| 20 – 40 | 20 |
| 10 – 20 | 39 |
| 5 – 10 | 20 |
| 5 and under | 17 |

It was fed at 5 kg per hour to a 18 inch dish granulator at an angle of tilt of 33° C from the vertical and a speed of 40 rpm. At the same time a solution of cobalt nitrate (8.1%) and aluminium nitrate (40%) was sprayed in at a rate calculated to afford 3.6% of CoO and 3.75% of equivalent nitric acid on the alumina. Granules were discharged at the rate of 8 kg per hour, containing 58.5% of material volatile at up to 1000° C. They were dried overnight under high relative humidity conditions at 80° C, then calcined at 550° C for 6 hours. They were transferred to a rotating drum and loaded with 11.2% of MoO₃ by spraying with the calculated quantity of ammonium molybdate liquor (17% MoO₃). The loaded granules were dried for 17 hours at 80° C, then calcined at 550° C for 6 hours. Their surface area and pore volume distribution were the same as those of the granules of Example 2. A fraction having the size range 2.4 to 4.75 mm (ASTM 4-8), mean crushing strength 3.6 kg and bulk density 0.55 was selected for a hydrodesulphurisation process run to be described below. The colour of the granules was deep blue.

EXAMPLE 4

Preparation of a catalyst with a pseudoböhmite content below 50%

The pseudoböhmite employed was as for Example 2. The sepiolite used had the following particle diameter distribution.

| diameter, microns | % |
|---|---|
| 150 and over | NIL |
| 105 – 150 | 50 |
| 75 – 105 | 29 |
| 40 – 75 | 20 |
| 20 – 40 | 1 |
| 20 and under | 0 |

Fifty-two parts by weight of the pseudoböhmite were blended dry with 69 parts by weight of the sepiolite in a mixer for 5 minutes; on a loss free basis the proportion of alumina to sepiolite was 2:3. This blend was fed at 5 kg/hr to a 18 inch dish granulator at an angle of tilt of 33° from the vertical and a speed of 38 rpm. At the same time a solution of cobalt nitrate (8.5%) and aluminium nitrate (4.0%) was sprayed in at a rate affording 3.1% of CoO on the alumina plus sepiolite, and 2.6% by weight of an equivalent nitric acid (from the aluminium nitrate) on the alumina plus sepiolite. Granules were discharged at the rate of 7.5 kg/hr, containing 51% matter volatile at 1000° C. They were dried for 17 hours at high relative humidity, calcined at 550° C for 6 hours, and transferred to a rotating drum and loaded with 11.6% MoO₃ by spraying with a calculated amount of ammonium molybdate liquor (17% MoO₃). The loaded granules were dried for 17 hours at 120° C and calcined at 550°

C for 6 hours. Their surface area was 136 m²/g. A fraction having size range 2.4 to 4.75, mean crushing strength 4 kg and bulk density 0.52 was selected for a hydrodesulphurisation process to be described below. From the deep blue colour of the granules it was evident that several percent of cobalt spinel were present.

EXAMPLE 5

Hydrodesulphurisation process

In a laboratory reactor having a catalyst bed volume of 100 ml the catalysts of Examples 1–4 were compared with a commercial cobalt molybdate catalyst (Comox 471) in the following conditions:

| | |
|---|---|
| Feed hydrocarbon | gas oil boiling at 174–349° C, initial sulphur content 0.2% w/w as S |
| Temperature | 370° C |
| Pressure | 450 psig |
| H$_2$/oil ratio | 240 liters/liter of liquid ("480" was erroneously given in the privisional spec) |
| Oil space velocity | 2 liters liquid/liter of catalyst/hour. |

Each was operated for 5 days to complete sulphurising of the catalyst and thus reach a stable performance; thereafter the outlet sulphur content was measured at intervals over a period of up to 55 days in all. It was observed that each catalyst maintained its activity throughout the period of operation; consequently the mean of the measured values is reported. The characteristics of each catalyst and the process results are reported in Table 1.

TABLE 1

| | Catalyst data | | | | Process data | | |
|---|---|---|---|---|---|---|---|
| | | | | granule | outlet | Relative activity "A"*** | |
| ref no | % CoO | % MoO$_3$ | bulk density | diameter mm | S.ppm w/w | days 5–10 | long period |
| Example 1 | 2.2 | 11.5 | 0.70 | 2.4–4.75 | 70 | 19(14.5) | |
| Example 2 | 2.9 | 12.5 | 0.49 | 3±0.8 | 40 | 25(19) | 30*(23) |
| Example 3 | 3.2 | 11.2 | 0.54 | 2.4–4.75 | 50 | 26(20) | |
| Example 4 | 2.7 | 11.6 | 0.52 | 2.4–4.75 | 88 | 12(9) | |
| Comox 471 | 3.3 | 11.6 | 0.74 | 2.6 | 100 | 11(9.5) | 14**(9.5) |

*days 5–55
**days 15–50
***The relative activity "A" is the ratio of the sulphur content of the liquid feed to that of the product hydrocarbon. The figures in brackets are derived from subsequent tests using other batches of the gas oil and are believed to be more representative than the first-quoted figures.

EXAMPLE 6

Extruded catalyst

A dry mixture of pseudoböhmite as described in Example 2 (1600 g), sepiolite as described in Example 4 (400 g) and Kordek (RTM) pre-cooked starch powder (80g) was wetted with a solution (1800 ml) of cobalt nitrate (equivalent to 66g CoO) and aluminium nitrate nonahydrate (142 g). The wet mixture was pug-milled and extruded through a 3.2 mm cicular die. The extrudates were dried at 90° C at high relative humidity, calcined at 550° C for 6 hours and broken into convenient short lengths (up to 10mm). The broken extrudates were transferred to a rotating drum and sprayed with a solution of ammonium heptamolydbate (25.6% MoO$_3$) to apply 12.2% of MoO$_3$. They were then dried at 90° C and calcined at 450°–550° C. Their composition and physical properties are set out in Table 2.

The resulting extrudates were tested as a hydrodesulphurisation catalyst in the process described in Example 5. A commercial catalyst (Ketjen 124-3ELD) and a spherical catalyst according to this invention were tested in the same way. The activity of the catalyst after sulphurising became complete is reported in Table 2 as the ratio "A" and log$_{10}$A. The reported activities had, at the time of writing this Example, been maintained for 10 days and the runs were being continued.

TABLE 2

| Catalyst | This example | Spherical | Commercial |
|---|---|---|---|
| Composition % | | | |
| CoO | 3.8 | 4.1 | 4.0 |
| MoO$_3$ | 12.3 | 13.0 | 12.2 |
| (loss at 650° C | 2.7 | 1.6 | 5.5) |
| Size: diameter, mm | 2.5 | 2.4 – 4.75 | 3.0 |
| av length, mm | up to 10 | — | 6.0 |
| Bulk density g/ml | 0.59 | 0.52 | 0.63 |
| Mean diametrical crushing strength, kg. | 60(6 mm length) | 3.9 | 26 |
| Attrition loss, % | under 0.5 | 0.4 | under 0.5 |
| Surface area, m²g | 230 | 219 | 294 |
| He density, g/ml | 3.28 | 2.891 | 2.825 |
| Hg density, g/ml | 1.07 | 0.869 | 1.124 |
| Pore volume, ml/g | 0.632 | 0.805 | 0.536 |
| Mean pore radius, A.U. | 55 | 74 | 36 |
| Initial activity | | | |
| A | 13.2 | 16.2 | 13.5 |
| log$_{10}$ A | 1.12 | 1.21 | 1.13 |

I claim:

1. A catalyst composition comprising pseudoböhmite alumina and/or pseudogamma alumina, a clay mineral, an oxide of at least one divalent metal selected from the group of transition metals and metals from Group IIA of the Periodic Table and an oxide of at least one polyvalent metal from Groups VA, VIA or VIIA of the Periodic Table, and being in the form of extrudates or approximately spherical granules of diameter at least 0.5 mm, said clay mineral being present in an amount sufficient to increase the mechanical strength of the extrudates or granules.

2. A composition according to claim 1 containing also alumina of a type formed under acid conditions, to the extent of 0.5 to 10% of the pseudoböhmite and pseudogamma aluminas.

3. A composition according to claim 1 in which the clay mineral sepiolite is present to the extent of 10 to 25% of the total composition.

4. A composition according to claim 1 in the form of granules having a largest dimension in the range 2–5 mm, a mean diametrical crushing strength of 3–10 kg, a bulk density in the range 0.3 to 0.8 g/ml and a pore volume in the range 0.5 to 1.5 ml/g, at least 0.03 ml/g of which is in pores of diameter greater than 2000 Angstrom units.

5. A composition according to claim 1 in the form of cylindrical extrudates having a largest dimension in the range 2–12 mm, a diameter in the range 2–5 mm, a mean diametrical crushing strength of 20–75 kg, a bulk density in the range 0.4 to 1.0 g/ml and a pore volume in the range 0.5 to 1.5 ml/g, at least 0.03 ml/g of which is in pores of diameter greater than 2000 Angstrom units.

6. A method of making a catalyst composition comprising pseudoböhmite alumina, pseudogamma alumina or mixtures thereof, 0–80% of a clay mineral, an oxide of at least one divalent metal and an oxide of at least one polyvalent metal from Groups VA, VIA or VIIA of the Periodic Table which comprises the steps:
- (a) forming a mixture of said alumina with at least one divalent metal oxide or a compound thermally decomposable thereto and a clay mineral if present;
- (b) shaping said mixture by extrusion or granulation into approximately spherical granules of diameter at least 0.5 mm;
- (c) adding at least one oxide of a polyvalent metal from Group VA, VIA or VIIA or a compound thermally decomposable thereto; and
- (d) drying and calcining the resulting product.

7. A method according to claim 6 in which a strong acid salt of the divalent metal or metals is contacted with the pseudoböhmite before the shaping operation.

8. A method according to claim 6 in which the extrusions or approximate spheres are calcined at 500°–900° C before adding the compounds of the polyvalent metal or metals.

9. A method according to claim 6 in which the particle diameter distribution of the pseudoböhmite is:

| Diameter, microns | % |
|---|---|
| over 600 | 0.0 |
| 300 – 600 | 0 – 15 |
| 105 – 300 | 5 – 45 |
| 75 – 105 | 0 – 20 |
| 40 – 75 | 15 – 30 |
| 20 – 40 | 10 – 30 |
| 10 – 20 | 0 – 30 |
| under 10 | 0 – 30. |

10. A composition according to claim 1 in which the clay mineral is selected from the group consisting of kaolinites, montmorillonites, attapulgites, sepiolites, illites, allophanes, fuller's earth, chlorite and serpentine.

11. A composition according to claim 10 wherein said clay mineral is present in an amount of from 10–25%.

12. A composition according to claim 10 wherein said clay mineral is present in an amount from 25–80%.

13. A method according to claim 6 in which the particle diameter distribution of the pseudoböhmite is

| diameter, microns | % by weight |
|---|---|
| over 105 | 0.0 |
| 40 – 105 | 0.15 |
| 20 – 40 | 15 – 25 |
| 10 – 20 | 20 – 40 |
| under 10 | 30 – 50 | and no clay mineral is present.

14. A method according to claim 9 in which the clay mineral is mixed with the pseudoböhmite before the shaping operation.

15. A method according to claim 6 in which the clay mineral content is in the range 10 to 25% of the finished composition.

16. A method according to claim 6 in which the clay mineral content is in the range 45 to 65% of the finished composition.

17. A method according to claim 6 in which a strong acid or a water-soluble aluminium salt is present during shaping, to the extent of 0.1 to 10% by weight, calculated as equivalent $HNO_3$, of the alumina introduced as pseudoböhmite.

* * * * *